(12) United States Patent
Akashi

(10) Patent No.: US 10,744,824 B2
(45) Date of Patent: Aug. 18, 2020

(54) PNEUMATIC TIRE

(71) Applicant: BRIDGESTONE CORPORATION, Tokyo (JP)

(72) Inventor: Tokumasa Akashi, Copley, OH (US)

(73) Assignee: BRIDGESTONE CORPORATION, Chuo-ku, Tokyo (JP)

(*) Notice: Subject to any disclaimer, the term of this patent is extended or adjusted under 35 U.S.C. 154(b) by 609 days.

(21) Appl. No.: 14/786,761

(22) PCT Filed: Apr. 17, 2014

(86) PCT No.: PCT/JP2014/002197
§ 371 (c)(1),
(2) Date: Oct. 23, 2015

(87) PCT Pub. No.: WO2014/174813
PCT Pub. Date: Oct. 30, 2014

(65) Prior Publication Data
US 2016/0075185 A1    Mar. 17, 2016

(30) Foreign Application Priority Data

Apr. 25, 2013    (JP) ................. 2013-092913

(51) Int. Cl.
*B60C 11/03* (2006.01)
*B60C 11/04* (2006.01)
(Continued)

(52) U.S. Cl.
CPC ........ *B60C 11/032* (2013.01); *B60C 11/0327* (2013.01); *B60C 11/04* (2013.01);
(Continued)

(58) Field of Classification Search
CPC ... B60C 11/032; B60C 11/0327; B60C 11/04; B60C 11/1236; B60C 2011/0353; B60C 19/002
See application file for complete search history.

(56) References Cited

U.S. PATENT DOCUMENTS

| | | | |
|---|---|---|---|
| 5,924,464 A | 7/1999 | White | |
| 2010/0224296 A1 | 9/2010 | Dobashi et al. | |
| 2013/0061992 A1* | 3/2013 | Mathonet | B60C 11/04 152/209.18 |

FOREIGN PATENT DOCUMENTS

| | | | |
|---|---|---|---|
| JP | 2-197402 A | 8/1990 | |
| JP | 5-338411 A | 12/1993 | |
| (Continued) | | | |

OTHER PUBLICATIONS

Machine translation of JP2007-269144 A (no date).*
(Continued)

*Primary Examiner* — Steven D Maki
*Assistant Examiner* — Philip N Schwartz
(74) *Attorney, Agent, or Firm* — Sughrue Mion, PLLC

(57) ABSTRACT

This disclosure aims to provide a pneumatic tire having improved noise reduction performance exhibited by a resonator. The pneumatic tire according to this disclosure has at least two circumferential grooves extending continuously on a tread surface, and has a resonator disposed on a land portion partitioned by two circumferential grooves among the circumferential grooves, the resonator having an air chamber opening toward a land portion surface at a position spaced from the circumferential grooves, one a more one-side narrow necks connecting the air chamber to one circumferential groove of the two circumferential grooves, and one or more other-side narrow necks connecting the air chamber to the other circumferential groove, the one-side narrow neck and the other-side narrow neck having cross (Continued)

section areas approximately identical to each other, and an extending length of the one-side narrow neck and an extending length of the other-side narrow neck being different.

6 Claims, 4 Drawing Sheets

(51) Int. Cl.
*B60C 19/00* (2006.01)
*B60C 11/12* (2006.01)

(52) U.S. Cl.
CPC ......... *B60C 11/1236* (2013.01); *B60C 19/002* (2013.01); *B60C 2011/0353* (2013.01)

(56) References Cited

FOREIGN PATENT DOCUMENTS

| JP | 06-055811 U | * | 8/1994 | ............ B60C 11/03 |
| JP | 10-29411 A | | 2/1998 | |
| JP | 2007-269144 A | | 10/2007 | |
| JP | 2009006831 A | | 1/2009 | |
| JP | 2009-83818 A | | 4/2009 | |
| JP | 2010-260403 A | | 11/2010 | |
| JP | 2010280265 A | | 12/2010 | |
| JP | 2011-143897 A | | 7/2011 | |
| JP | 2013-133084 A | | 7/2013 | |
| WO | 2009/047999 A1 | | 4/2009 | |

OTHER PUBLICATIONS

Machine translation of JP06-055811 U (no date).*
Machine translation of JP2010-260403 (no date).*
Notification of Reasons for Refusal for Japanese Patent Application No. 2013-092913, dated Dec. 24, 2013.
International Search Report of PCT/JP2014/002197, dated May 13, 2014. [PCT/ISA/210].

* cited by examiner

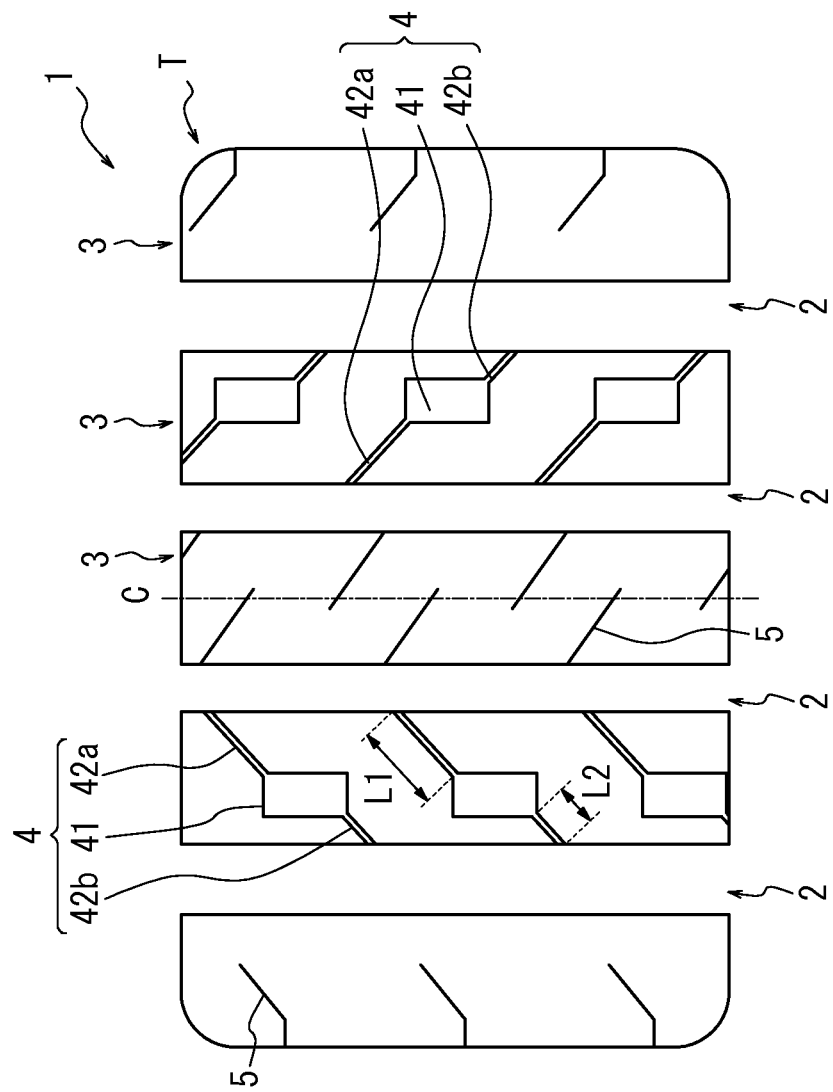

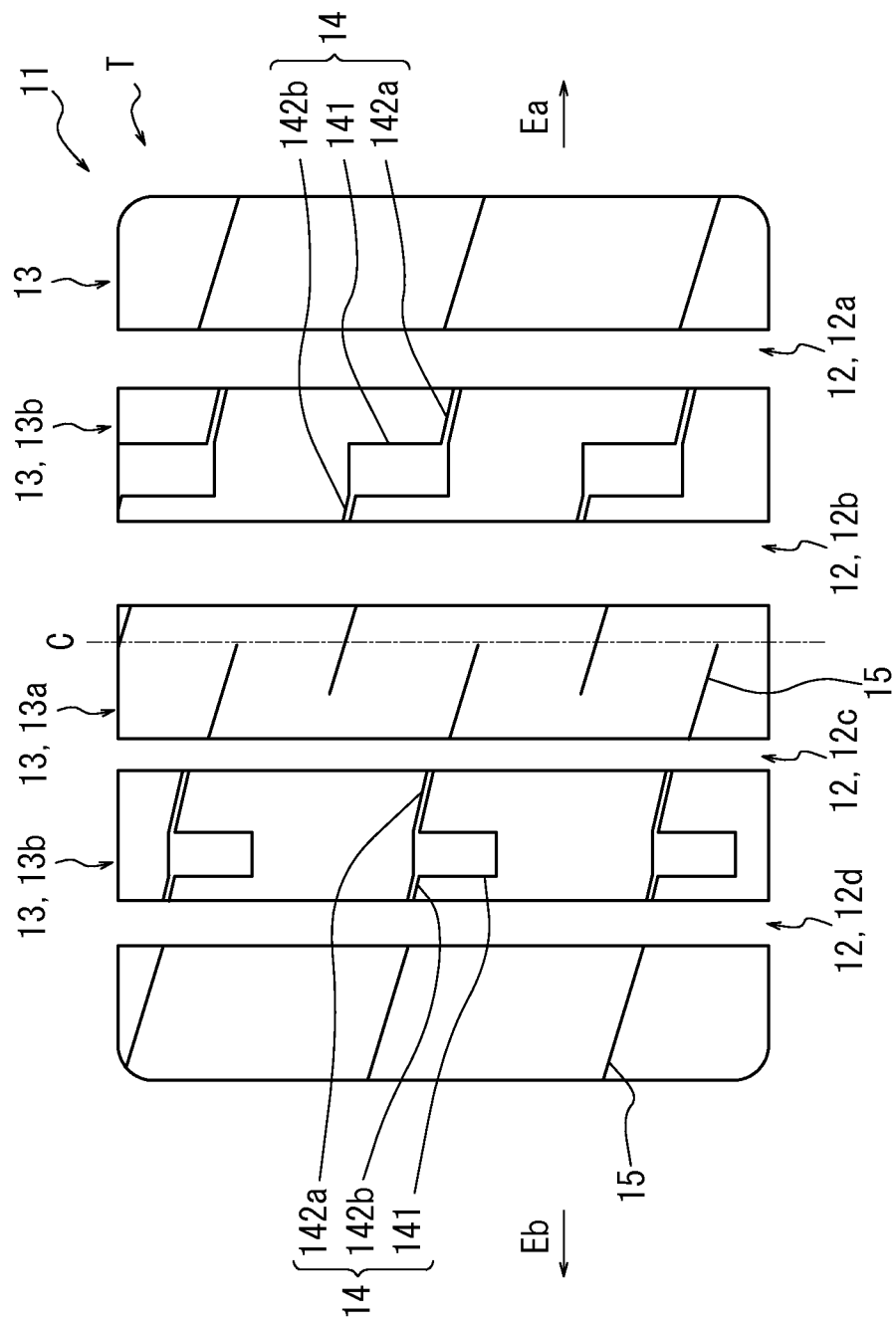

PNEUMATIC TIRE

CROSS REFERENCE TO RELATED APPLICATIONS

This application is a National Stage of International Application No. PCT/JP2014/002197 filed Apr. 17, 2014, claiming priority based on Japanese Patent Application No. 2013-092913, filed Apr. 25, 2013, the contents of all of which are incorporated herein by reference in their entirety.

TECHNICAL FIELD

This disclosure relates to a pneumatic tire.

BACKGROUND

Recently, along with improvement in silence of vehicles, since contribution to vehicle noises due to rotation of pneumatic tire with load is large, reduction thereof is required. Among such noises, tire noises having a high frequency, in particular, around 1000 Hz, are a main cause of vehicle exterior noises, and measures for reduction thereof is required for solving environment problems.

This tire noise around 1000 Hz is mainly generated by air-column resonance. Air column resonance sound refers to a noise generated by resonance of air inside a tube surrounded by a circumferential groove extending continuously in a tread circumferential direction, and a tread surface, and is usually observed within a range of around 800 to around 1200 Hz in ordinary passenger vehicles, and is a majority of noises generated from pneumatic tires due to a high peak sound pressure level and a wide frequency band. Moreover, since human hearing is especially sensitive to a frequency band around 1000 Hz, reduction of such air column resonance sound is effective as well in view of improvement in silence when travelling on a feeling surface.

Here, as a pneumatic tire having reduced air column resonance sound, suggested are, e.g., a pneumatic tire having a resonator disposed on a land portion partitioned by a circumferential groove, the resonator having an air chamber opening toward a land portion surface, and having one narrow neck connecting the air chamber to the circumferential groove (e.g., PTL 1), and a pneumatic tire having a resonator disposed on a land portion partitioned between two circumferential grooves, the resonator having an air chamber opening toward the land portion, one or more narrow necks connecting the air chamber to one circumferential groove of two circumferential grooves, and one or more narrow necks connecting the air chamber to the other circumferential groove (e.g., PTL 2), etc. According to the former pneumatic tire, by disposing a resonator, it is regarded as possible to reduce air column resonance sound generated in the circumferential groove; further, according to the latter pneumatic tire, comparing to the resonator having narrow necks opening toward the one circumferential groove according to the former pneumatic tire, it is possible to simultaneously reduce air column resonance sound generated in the two circumferential grooves. Therefore, it is regarded possible to effectively reduce air column resonance sound, reduce the number to dispose resonators, and thus possible to prevent deterioration of land portion rigidity.

CITATION LIST

Patent Literature

PTL 1: JPH5-338411A
PTL 2: JP2007-269144A

SUMMARY

Technical Problem

Here, according to the pneumatic tire having a resonator disposed on a land portion partitioned between two circumferential grooves, the resonator having one narrow neck opening toward one circumferential groove of the two circumferential grooves and one narrow neck opening toward the other circumferential groove, from the viewpoint of, e.g., designing or appearance after wear of the tire, there are cases that cross section areas of each narrow neck are made equal, and if the cross section areas are equal, it probably becomes difficult to reduce air column resonance sound.

Therefore, this disclosure aims to provide a pneumatic tire having an improved noise reduction performance exhibited by a resonator.

Solution to Problem

The pneumatic tire according to this disclosure has at least two circumferential grooves on a tread surface, and has a resonator disposed on a land portion partitioned by two circumferential grooves among the circumferential grooves, the resonator having an air chamber opening toward the land portion surface at a position spaced from the circumferential grooves, one or more one-side narrow necks connecting the air chamber to one circumferential groove of the two circumferential grooves, and one or more other-side narrow necks connecting the air chamber to the other circumferential groove, the one-side narrow neck and the other-side narrow neck having cross section areas approximately identical to each other, and an extending length of the one-side narrow neck and an extending length of the other-side narrow neck being different.

According to this configuration, even if the cross section areas of the narrow necks opening toward each circumferential groove are approximately identical, it is possible to improve noise reduction performances of the resonator.

Further, according to the pneumatic tire of this disclosure, the type of the resonator is not specifically limited as long as it effectively reduces air column resonance sound; e.g., a Helmholtz type resonator may be used. In this case, a resonator 6 may be modelized into a shape as shown in FIG. 2(a), and its resonance frequency $f_0$ is represented by Formula 1, where as for the narrow necks 7, a diameter is r, an extending length is $l_0$, a cross section area is S, a volume of the air chamber 8 is V, and the velocity of sound is c.

[Formula 1]

$$f_0 = \frac{c}{2\pi} \sqrt{\frac{S}{(l_0 + 1.3r)V}} \quad (1)$$

Here, compensation to the length of the narrow necks 7 in the aforementioned formula is ordinarily determined in an experiment, and the value thereof varies in different documents, while a value of 1.3r is used here.

Moreover, a resonance frequency $f_0$ of a Helmholtz type resonator 6 having two narrow necks 7a, 7b disposed with respect to each air chamber 8, as schematically shown in FIG. 2(b), may be represented similarly by Formula (2), where diameters of each narrow neck 7a, 7b are $r_a$, $r_b$, extending lengths thereof are $l_{0a}$, $l_{0b}$, cross section areas are $S_a$, $S_b$, a volume of the air chamber 8 is V, and the velocity of sound is c.

[Formula 2]

$$f_0 = \frac{c}{2\pi}\sqrt{\frac{S_a + S_b}{\frac{((l_{0a} + 1.3r_a) + (l_{0b} + 1.3r_b))}{2}V}} \quad (2)$$

Accordingly, by selecting the cross section areas $S_a$, $S_b$ of the narrow necks 7a, 7b, the volume V of the air chamber 8, etc., it is possible to vary the resonance frequency $f_0$ of the resonator 6 according to the demands. Moreover, as shown in Formula (2) using an example having two narrow necks 7, it is understood that in the case that the narrow necks 7 are in a plurality, there is practically no problem to perform calculation by using one equivalent narrow neck 7, which has a total cross section of the plurality of narrow necks 7a, 7b as the cross section, and an average length of the plurality of narrow necks 7a, 7b as the extending length.

Here, in this disclosure, "the one-side narrow neck and the other-side narrow neck having cross section areas approximately identical to each other" means that a value obtained by dividing a difference between each cross section area of the one-side narrow neck and the other-side narrow neck by a cross section area of a narrow neck having a relatively smaller cross section area is 10% or less.

Moreover, in this disclosure, the "cross section area" of a narrow neck refers to a cross section area in a cross section along a direction orthogonal to an extending direction of the narrow neck, and refers to an average cross section area in the case that the cross section area varies (a value obtained by dividing the volume of the narrow neck by the extending length thereof).

Further, in this disclosure, in the case that there are two or more of one-side narrow necks and/or other-side narrow necks in each resonator, total extending lengths of the one-side narrow necks or the other-side narrow necks of each resonator are used as the "extending lengths" of the one-side narrow necks or other-side narrow necks, and total cross section areas of the one-side narrow necks or other-side narrow necks of each resonator are used as "cross section areas" of the one-side narrow necks or other-side narrow necks.

Moreover, in this disclosure, the "extending lengths" of each narrow neck refer to lengths measured along the extending directions of the narrow necks. Further, in this disclosure, "an extending length of the one-side narrow neck and an extending length of the other-side narrow neck are different" means that the extending length of the one-side narrow neck is longer than the extending length of the other-side narrow neck by 5% or more.

Moreover, in this disclosure, contacting conditions of the tread surface are, if without specific limitations, a state that a determined air pressure is applied and a weight 80% of a maximum load weight is loaded to a tire mounted to an applicable rim. Incidentally, the "applicable rim" is an industrial standard effective in a region where the tire is manufactured and used, and refers to an approved rim (or an "Approved Rim", "Recommended Rim") at an applicable size, as described in JATMA (the Japan Automobile Tyre Manufacturers Association) YEAR BOOK in Japan, ETRTO (European Tyre and Rim Technical Organisation) STANDARD MANUAL in Europe, TRA (THE TIRE and RIM ASSOCIATION INC.) YEAR BOOK in the United State of America, etc. Moreover, a state that "a determined air pressure to a tire mounted to an applicable rim" refers to a state that the tire is mounted to an aforementioned applicable rim, and is applied an air pressure of a single wheel corresponding to a maximum load capability (a maximum air pressure) at applicable size and ply rating, as described in JATMA, etc. Further, the air mentioned here is substitutable with an inactive gas such as nitrogen gas and the like.

Further, dimensions of the tire refer to dimensions of a tire at unloaded condition, which is mounted to an applicable rim and applied a determined air pressure, if without specific limitations.

Further, both the "narrow neck" and the "air chamber" here refer to those opening within a contact patch under the aforementioned contacting conditions.

Here, in the pneumatic tire according to this disclosure, it is preferable that the cross section area of one circumferential groove is smaller relatively to the cross section area of the other circumferential groove, and the extending length of the one-side narrow neck is longer than the extending length of the other-side narrow neck.

Moreover, in this case, when the tire is mounted to a vehicle, it is preferable that a mounting direction of the tire with respect to the vehicle is specified such that a one-end side of contacting ends of both sides of the tread surface is on a vehicle side, and an other-end side of the contacting ends is on an external side of the vehicle, the one circumferential groove being located on the one-end side, and the other circumferential groove being located on the other-end side.

Moreover, in the pneumatic tire according to this disclosure, it is preferable that the cross section area of the one circumferential groove is larger relatively to the cross section area of the other circumferential groove, and the extending length of the one-side narrow neck is longer than the extending length of the other-side narrow neck.

Here, in the pneumatic tire according to this disclosure, the extending length of the one-side narrow neck is preferably 1.1 to 3.2 times to the extending length of the other-side narrow neck.

According to this configuration, even if the cross section areas of the narrow necks opening toward each circumferential groove are approximately identical, it is possible to further improve noise reduction performances of the resonator.

Advantageous Effect

According this disclosure, it is possible to provide a pneumatic tire having an improved noise reduction performance exhibited by a resonator.

BRIEF DESCRIPTION OF THE DRAWINGS

FIG. 1 is a partial development view illustrating a tread pattern of a pneumatic tire according to an embodiment of this disclosure;

FIG. 5 is a partial development view illustrating a tread pattern of a pneumatic tire according to another embodiment of this disclosure.

DETAILED DESCRIPTION

Figure 2A:
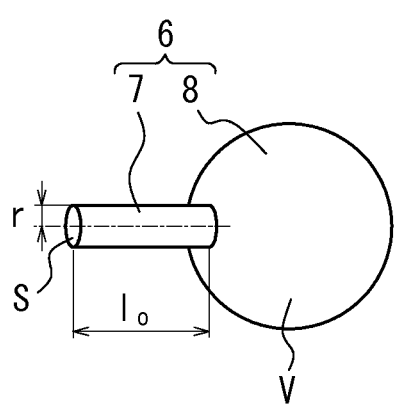
FIG. 2(a) is a drawing schematically illustrating a Helmholtz type resonator having one narrow neck, and FIG. 2(b) illustrating a Helmholtz type resonator having two narrow necks.
Figure 2B:
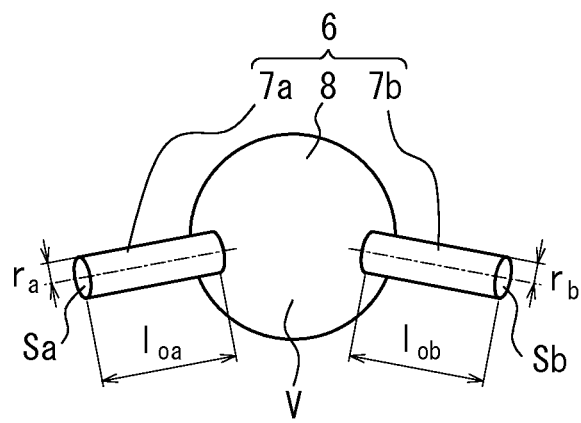

An embodiment of this disclosure will be described below with reference to the drawings.

FIG. 1 is a partial development view illustrating a tread pattern of a pneumatic tire 1 according to an embodiment of this disclosure. Further, internal enforcing structure, etc. of the tire is the same as an ordinary radial tire, and is thus omitted in the drawing here.

In the pneumatic tire 1 according to an embodiment of this disclosure, at least two circumferential grooves 2, and as for the case illustrated in FIG. 1, four circumferential grooves 2 are disposed on a tread surface T in a manner extending continuously approximately in a tread circumferential direction. Further, in FIG. 1, the circumferential grooves 2 exhibit a mode extending linearly along the tread circumferential direction, while the circumferential grooves 2 are not specifically limited as long as continuously extending in the tread circumferential direction; e.g., an extending mode in a zigzag shape, a wavy shape, etc. may be used.

Moreover, on the tread surface T, as illustrated in FIG. 1, a rib-like land portion 3 is partitioned into 3 rows on a tire width directionally inner side by circumferential grooves 2 adjacent to each other, and the rib-like land portion 3 is partitioned into 2 rows on a tire width directionally outer side (shoulder portion) of the tread surface T by the circumferential grooves 2 and a contacting end on the tire width directionally outer side.

In this embodiment, on the rib-like land portion 3 located on both sides of the rib-like land portion 3 located on a central portion of the tread surface T, as illustrated in FIG. 1, at a position spaced from the circumferential grooves 2 partitioning the rib-like land portion 3, a resonator 4 is disposed, the resonator 4 having an air chamber 41 opening toward a land portion surface, a one-side narrow neck 42a (the tire width directionally inner side in FIG. 1) connecting the air chamber 41 to one circumferential groove 2 of the two circumferential grooves 2, and an other-side narrow neck 42b (the tire width directionally outer side in FIG. 1) connecting the air chamber 41 to the other circumferential groove 2. Further, both the one-side narrow neck 42a and the other-side narrow neck 42b have approximately same cross section areas (identical in the embodiment illustrated in FIG. 1).

Further, as far as illustrated in FIG. 1, one narrow neck 42a and one narrow neck 42b, which are respectively opening toward the one and the other circumferential grooves 2, are disposed, while it is possible as well to dispose two or more narrow necks 42a, 42b opening toward the one and the other circumferential grooves 2 on both sides or only on one side. Moreover, in FIG. 1, the cross section areas of the one-side narrow neck 42a and the other-side narrow neck 42b are set to an identical value by setting the groove widths and the groove depths of the both to identical values, while it is possible as well to obtain identical cross section areas by multiplying different groove widths and groove depths.

Moreover, in this embodiment, the resonator 4 reduces air column resonance sound by using the air chamber 41, the one-side narrow neck 42a and the other-side narrow neck 42b.

In the pneumatic tire 1 according to this disclosure, an extending length L1 of the one-side narrow neck 42a and an extending length L2 of the other-side narrow neck 42b are different. Further, in the embodiment illustrated in FIG. 1, the extending length L1 of the one-side narrow neck 42a is longer than the extending length L2 of the other-side narrow neck 42b.

By setting the extending length of the one-side narrow neck and the extending length of the other-side narrow neck to identical values, resonance generated by the resonator via both narrow necks is neutralized, while in the case that the extending length L1 of the one-side narrow neck 42a and the extending length L2 of the other-side narrow neck 42b are set to be different, resonance generated by the resonator 4 is not neutralized, and accordingly, resonator 4 functions sufficiently, which enables improvement of noise reduction performances. By improving noise reduction performances of the resonator 4, it is possible to, e.g., reduce a number of resonators 4 disposed on the tread surface T while sufficiently maintaining the noise reduction performance of each resonator 4. As a result, a rigidity of the land portion is improved, which enables improvement of a steering stability of the tire 1. On the other hand, it is possible to improve the degree of design freedom of the tread pattern, such as enabling to dispose on the tread surface T various resonators 4 each having a different resonance frequency.

Moreover, the extending length L1 of the one-side narrow neck 42a is preferably 1.1 to 3.2 times of the extending length L2 of the other-side narrow neck 42b. Accordingly, the resonator 4 functions more efficiently, which enables to improve the noise reduction performance. Further, if the extending length L1 of the narrow neck is less than 1.1 times to the L2, there is a probability that the resonance due to resonators 4 having approximately same cross section areas is neutralized. Moreover, if the extending length L1 of the narrow neck is more than 3.2 times to the L2, a tire width directional position of the air chamber 41 of the resonator 4 within the rib-like land portion 3 is greatly displaced on the other circumferential groove 2 side (the side of the circumferential groove 2 toward which the other-side narrow neck 42b opens); therefore, a rigidity in the tire width direction of part in the rib-like land portion 3 where the air chamber 41 is located becomes unbalanced, which causes a tendency of poor appearance of the rib-like land portion 3.

Further, from the same viewpoint, the extending length L1 of the one-side narrow neck 42a is more preferably 1.2 to 3.0 times of the extending length L2 of the other-side narrow neck 42b.

Each narrow neck 42a, 42b may open to a circumferential groove 2 having any value of cross section area. However, as illustrated in FIG. 1, it is preferable that the one-side narrow neck 42a, which has a longer extending length, opens to a circumferential groove 2 having a relatively smaller cross section area, and the other-side narrow neck 42b, which has a shorter extending length, opens to a circumferential groove 2 having a relatively larger cross section area. Further, in this embodiment, a circumferential groove 2 having a relatively smaller cross section area (the one circumferential groove 2) is disposed on a tire width directionally inner side, and a circumferential groove 2 having a relatively larger cross section area (the other circumferential groove 2) is disposed on a tire width directionally outer side.

Accordingly, as for an air column resonance sound generated by the circumferential grooves 2, since a sound pressure of the air column resonance sound is increased in the circumferential groove 2 having a larger cross section area, it is possible to relatively shorten the extending length of the narrow neck opening to the circumferential groove 2 having a relatively larger cross section area, to thereby improve the efficiency of the resonance of the resonator 4, and to thereby improve the noise reduction performances exhibited by the resonator 4.

Further, on the contrary, in the case that the one-side narrow neck 42*a* which has a longer extending length opens to a circumferential groove 2 having a relatively larger cross section area, and the other-side narrow neck 42*b* which has a shorter extending length opens to a circumferential groove 2 having a relatively smaller cross section area, it is possible to improve the noise reduction performances of the resonator 4, and simultaneously suppress the reduction of steering stability. Namely, since the land portion partitioned by the two circumferential grooves 2 having different cross section areas tends to have a comparatively lower rigidity on the side of the circumferential groove having a relatively larger cross section area, if the one-side narrow neck 42*a* opens to the circumferential groove 2 having a relatively larger cross section area, a position of center of gravity of the air chamber 41 of the resonator 4 is spaced from a central position of the rib-like land portion 3 by the circumferential groove 2 having a larger cross section area. Accordingly, it is possible to suppress the reduction of rigidity of the land portion 3 on the side of the circumferential groove 2 having a larger cross section area, and simultaneously improve the balance of rigidity in the tire width direction of the part in the rib-like land portion 3 where the air chamber 41 is located, and suppress the reduction of steering stability.

Further, as mentioned above, in the state that the cross section areas of the circumferential grooves 2, toward which the one-side narrow neck 42*a* and the other-side narrow neck 42*b* open, are different, any disposing mode of these circumferential groove 2 within the tread surface T may be used, and accordingly, as illustrated in FIG. 1, it is possible to relatively increase the cross section area of the circumferential groove 2 on the tire width directionally outer side within the tread surface T, and, although not illustrated, from the viewpoint of drainage performance, it is possible to relatively increase the cross section area of the circumferential groove 2 on the tire width directionally inner side.

Moreover, the magnitude relations between each cross section area of the two circumferential grooves 2 can be achieved by varying groove widths of each circumferential groove 2, or depths of each circumferential groove 2, or both groove widths and depths thereof, etc.

Figure 3A:
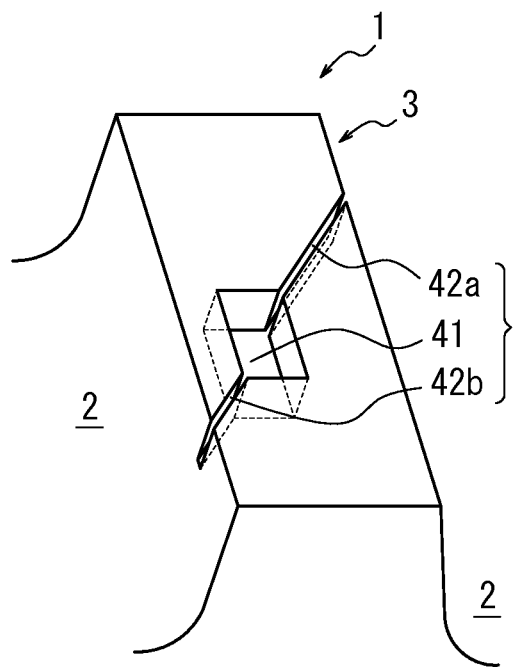
FIGS. 3(a) and (b) is a perspective view illustrating an example of forming mode of the resonator in the pneumatic tire of FIG. 1.
Figure 3B:
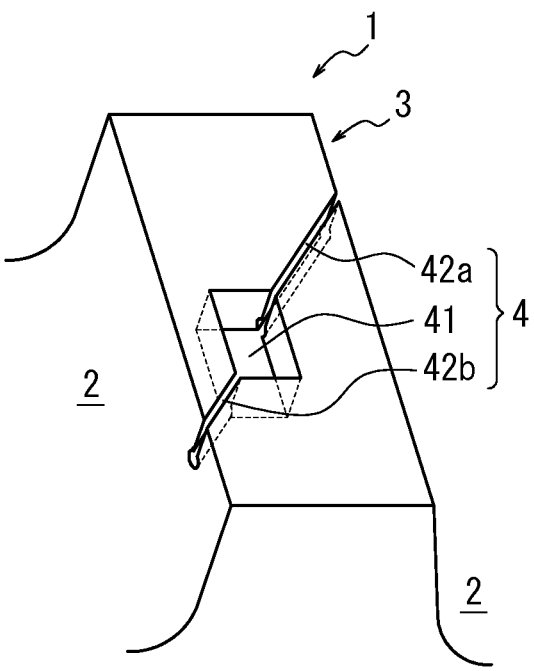

Here, the narrow necks and the air chamber 41 of the resonator 4 may have any opening width to the land portion, depth, extending mode, etc., as long as they open to a road surface within the contact patch under the aforementioned contacting conditions, and generate an expected resonance frequency. In the narrow neck, at unloaded condition where a determined air pressure is applied to the tire 1 mounted to an applicable rim, for example, the opening width toward the land portion surface is preferably within a range of 0.5 to 2.0 mm, more preferably a range of 0.7 to 2.0 mm. Moreover, from the viewpoint that the resonator 4 is formed and functions sufficiently to obtain an expected resonance frequency, a depth from the tread surface T of the narrow neck is preferably set to ⅓ to ½ of a depth from the tread surface T of the circumferential groove 2 to which the narrow neck opens. Further, as illustrated in FIG. 3, a cross-sectional shape along a direction orthogonal to an extending direction of the narrow neck may be, e.g., a square such as a rectangle (FIG. 3(*a*)), or a flask shape having an enlarged portion on a bottom portion of the narrow neck (FIG. 3(*b*)).

Moreover, as illustrated in FIG. 1 and FIG. 4(*a*)-(*c*), the extending mode of the narrow neck may be a bended shape, a linear shape, a back-bent shape, or a combination thereof. Moreover, although omitted in the drawing, on a side wall of the narrow neck, a plurality of protrusions protruding from the side wall may be disposed, and according to this configuration, it is possible to prevent incidental blockade of the narrow neck.

Further, as for the aforementioned dimensions and shapes of the narrow neck, as long as the extending lengths L1, L2 of the one-side narrow neck 42*a* and the other-side narrow neck 42*b* of each resonator 4 satisfy the relations of this disclosure, each one of a plurality of narrow necks of the resonator 4, or the narrow necks of a plurality of resonators 4 within one row of the rib-like land portion 3 or among the rib-like land portion 3, may have any dimensions or shapes.

Further, as for the air chamber 41 of the resonator 4, a shape of the opening toward the land portion surface of the air chamber 41 may be any shape, such as a curved outline shape including a circle, an ellipse, etc. (FIG. 4(*a*)-(*c*)), or a polygonal outline shape (FIG. 1, FIG. 4(*d*)-(*g*)), etc.; further, a cross-sectional shape of the bottom portion of the air chamber 41 may be a flat shape, a bended shape, etc. Further, opening shapes, etc. of each air chamber 41 of a plurality of resonator 4 may be identical or different within one row of the rib-like land portion 3 or among the land portions 3.

Further, as far as illustrated in FIG. 1, the air chambers of each resonator 4 are disposed within the rib-like land portion 3, nearer to the other (on the tire width directionally outer side in FIG. 1) circumferential groove 2 than the one (on the tire width directionally inner side in FIG. 1) circumferential groove 2, while the air chambers may also be disposed at a central portion of the rib-like land portion 3, or nearer to the one circumferential groove 2.

Further, although not illustrated, within one row of rib-like land portion 3, as for the resonator 4 of this disclosure, as mentioned above, it is possible to vary the narrow necks of the resonators 4 and/or the dimensions or shapes of the air chambers, and to dispose a plurality of resonators 4 having resonance frequencies different from each other.

Moreover, for the purpose that the resonators 4 disposed on the tread surface T are formed and function to obtain an expected resonance frequency, and that all narrow necks of the resonators 4 open to the road surface within the contact patch even under the aforementioned contacting conditions, a total number of one-side narrow necks 42*a* and other-side narrow necks 42*b* of each resonator 4 is preferably 2 to 4.

Further, the resonator 4 illustrated in FIG. 4(*f*) has respectively two and one of the one-side narrow necks 42*a* and the other-side narrow neck 42*b*, and has more one-side narrow necks 42*a* than the other-side narrow neck 42*b*, while the number of the other-side narrow necks 42*b* may be a larger number as well. Moreover, FIG. 4(*g*) illustrates a mode having two of both one-side narrow necks 42*a* and other-side narrow necks 42*b*.

Further, in the case that a resonators 4 having 3 or more narrow necks is disposed on a land portion 3 partitioned by two circumferential grooves 2 having cross section areas different from each other, from the viewpoint that the resonator 4 functions sufficiently, one-side narrow necks 42a open to a circumferential groove 2 having a relatively smaller cross section area, other-side narrow necks 42b open to a circumferential groove 2 having a relatively larger cross section area, and the number of the one-side narrow necks 42a is more than the number of the other-side narrow necks 42b.

On the contrary, in the aforementioned case, since the one-side narrow necks 42a open to a circumferential groove 2 having a relatively larger cross section area, the other-side narrow necks 42b open to a circumferential groove 2 having a relatively smaller cross section area, and the number of the one-side narrow necks 42a is less than the number of other-side narrow necks 42b, it is possible to render the resonator 4 function better without deterioration of steering stability.

Figure 4A:
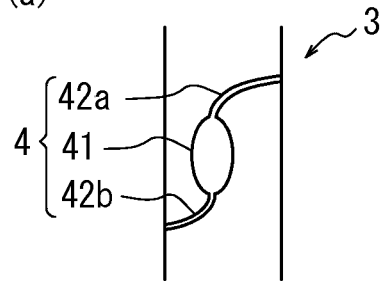
FIG. 4(a)-(g) is an enlarged developed view illustrating an alternative example of both the narrow neck and the air chamber of the pneumatic tire of FIG. 1.
Figure 4E:
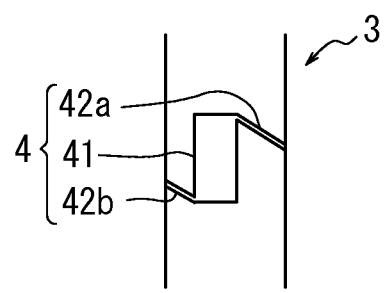
Figure 4B:
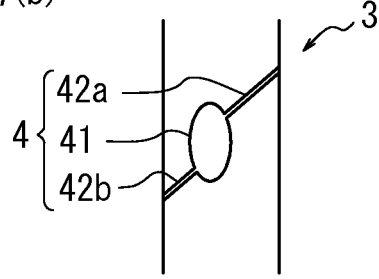
Figure 4F:
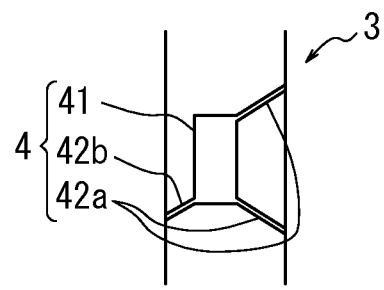
Figure 4C:
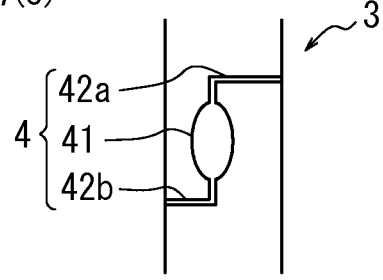
Figure 4G:
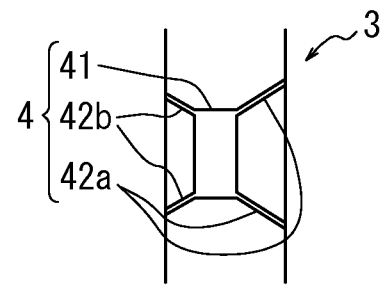

In the pneumatic tire 1 of this disclosure, extending directions of each one-side narrow neck 42a and each other-side narrow neck 42b with respect to the air chamber 41 are not limited, while from the viewpoint of reducing a pitch noise generated due to confliction of edges opening toward the land portion surface of the narrow necks 42a 42b and the air chamber 41 with the road surface during rotation of the tire 1, each narrow necks 42a, 42b preferably extend not toward a tread circumferentially inner side with respect to the air chamber 41 as illustrated in FIG. 4(e), but toward a tread circumferentially outer side with respect to the air chamber 41, as illustrated in FIG. 1, FIG. 4(a)-(c), etc. In other words, the narrow necks 42a, 42b preferably extend in a manner such that the narrow necks 42a, 42b and the air chamber 41 overlap each other less in a width direction of the rib-like land portion 3. Further, from this viewpoint, as illustrated in FIG. 1, FIG. 4(a), etc., the narrow necks 42a, 42b preferably opens to a circumferential groove 2 in a manner extending from a position on a tread circumferentially outer end of the air chamber 41 toward a tread circumferentially outer side.

Figure 4D:
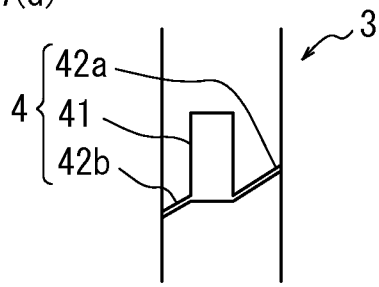

Further, in order to adjust the rigidity of the rib-like land portion 3 having a resonator 4 disposed thereon between, e.g., the rib-like land portion 3, as illustrated in FIG. 4(d), the one-side narrow neck 42a and the other-side narrow neck 42b may extend from a same tread circumferential end portion of the air chamber 41 respectively in directions opposite to each other in the tread circumferential direction. Further, with respect to the resonator 4 illustrated in FIG. 4(d), the one-side narrow neck 42a and the other-side narrow neck 42b may also respectively extend in a same tread circumferential direction from a same tread circumferential end portion of the air chamber 41.

Further, as illustrated in FIG. 1, each resonator 4 disposed on the tread surface T are located among the rib-like land portion 3 in a manner displaced from each other in the tread circumferential direction, but may also be located at a same position in the tread circumferential direction.

Moreover, in the rib-like land portion partitioned between two circumferential grooves having cross section areas different from each other, other than the resonator according to this disclosure, it is also possible to dispose a well-known resonator, such as a resonator having only one narrow neck and/or in which the one-side narrow neck and the other-side narrow neck have cross section areas different from each other, etc.

Further, on the tread surface T, the resonator according to this disclosure and/or a well-known resonator may be disposed on the rib-like land portion 3 on a tire width directionally central side as illustrated in FIG. 1.

Moreover, on the tread surface T, as illustrated in FIG. 1, other than the resonator 4, it is possible to dispose a sipe 5 and/or a groove for ensuring drainage performance, etc. Further, the sipe 5 refers to a groove having an opening width of 1.5 mm or less, which closes within the contact patch under the aforementioned contacting conditions that a determined air pressure is applied and a weight 80% of a maximum load weight is loaded to the tire 1 mounted to an applicable rim, and opens within the contact patch at unloaded condition that the tire one is mounted to an applicable rim and applied a determined air pressure.

Next, a pneumatic tire according to another embodiment of this disclosure is described with FIG. 5. Further, description in detail on the members having the same configuration as the former pneumatic tire 1 is omitted in the following.

The pneumatic tire according to another embodiment of this disclosure is a pneumatic tire 11 as illustrated in FIG. 5 having a specified tire mounting direction to the vehicle, in which, between contacting ends on both sides of the tread surface T, a one-end side Ea (in FIG. 5, a right side) is a vehicle side when the tire 11 is disposed to the vehicle, and an other-end side Eb (in FIG. 5, a left side) is an outer side of the vehicle. Moreover, this tire 11 is disposed to the vehicle at an attitude in which a camber angle is applied such that a part on a road surface side of each tire 11 on left and right sides in a front view of the vehicle faces an outer side of the vehicle.

Here, in this embodiment, as illustrated in FIG. 5, 4 or more circumferential grooves 12, in the drawing, 4 circumferential grooves 12 are disposed on the tread surface T. Additionally, in the drawing, a central rib-like land portion 13a through which a tire equatorial plain C partitioned by a circumferential groove 12 passes, and two rows of mediate rib-like land portion 13b on both adjacent regions thereof, are disposed.

Moreover, in this embodiment, each cross section area of the two circumferential grooves 12 adjacent to each other, which partition the mediate rib-like land portion 13b, are set such that a circumferential groove 12 on the other-end side Eb is larger than a circumferential groove 12 on the one-end side Ea. Moreover, each cross section area of the circumferential grooves 12 disposed on a tire half portion on the other-end side Ea is larger than each cross section area of the circumferential grooves 12 disposed on a tire half portion on the other-end side Eb. Namely, the cross section areas of the 4 circumferential grooves 12 are in an ascending order of a circumferential groove 12c, a circumferential groove 12d, a circumferential groove 12a and a circumferential groove 12b.

Further, as illustrated in FIG. 5, the mediate rib-like land portion 13b on the one-end side Ea is located nearer to the tire equatorial plain C than the mediate rib-like land portion 13b on the other-end side Eb, and the central rib-like land portion 13a is located nearer to the other-end side Eb than the tire equatorial plain C.

Each air chamber 141 of the resonator 14 disposed on the mediate rib-like land portion 13b on the one-end side Ea has a larger volume of the air chamber 141 than each air chamber 141 of the resonator 14 disposed on the mediate rib-like land portion 13b on the other-end side Eb.

Moreover, the one-side narrow neck 142a and the other-side narrow neck 142b of the resonator 14 on the one-end side Ea are each extending in opposite directions in the tread circumferential direction from both end portions in the tread circumferential direction of the air chamber 141. Moreover, the one-side narrow neck 142a and the other-side narrow neck 142b of the resonator 14 on the other-end side Eb are each extending in opposite directions in the tread circumferential direction from one end portion in the tread circumferential direction of the air chamber 141.

Further, the resonator 14 is disposed on the rib-like land portion 13 such that the one-side narrow neck 142a opens toward the circumferential groove 12 having a smaller cross section area of the two circumferential grooves 12 partitioning the rib-like land portion 13, and the other-side narrow neck 142b opens toward the circumferential groove 12 having a larger cross section area of the two circumferential grooves 12.

According to this embodiment, in the case that, e.g., a camber angle is set when disposing the tire 11 to a vehicle, the circumferential groove 12 having a relatively larger cross section area may be disposed on the half portion of the tire on the one-end side Ea, in which case an air column resonance sound having a high sound pressure is generated from the circumferential groove 12 having a relatively larger cross section area.

Therefore, by setting volumes of each air chamber 141 of the resonator 14 disposed on the half portion of the tire on the one-end side Ea to be comparatively larger than volumes of each air chamber 141 of the resonator 14 disposed on the half portion of the tire on the other-end side Eb, it is possible to reduce the air column resonance sound more effectively.

Moreover, in the resonator 14 on the one-end side Ea and the resonator 14 on the other-end side Eb, the one-side narrow neck 142a and the other-side narrow neck 142b each have different end portions of extending in the tread circumferential direction of the air chamber, and it is thus possible to adjust the rigidity of the land portion on the one-end side Ea and the other-end side Eb.

Further, since the other-side narrow neck 142b having a shorter extending length opens to the circumferential groove 12 having a relatively larger cross section area, it is possible to reduce an air column resonance sound more effectively.

Further, as far as illustrated in FIG. 5, no resonator 14 is disposed on the central rib-like land portion 13a of the tread surface T, while it is also possible to dispose the resonator 14 according to this disclosure and/or a well-known resonator.

Moreover, it is possible to dispose a plurality of sipes 15 on each land portion within the tread surface T.

The foregoing has explained an embodiment of this disclosure with reference to the drawings. However, the pneumatic tire of this disclosure is not particularly limited to the aforementioned examples, and appropriate changes may be made to the pneumatic tire of this disclosure.

INDUSTRIAL APPLICABILITY

According to this disclosure, a pneumatic tire having improved noise reduction performance exhibited by a resonator is provided.

REFERENCE SIGNS LIST 1, 11 pneumatic tire
2, 12 circumferential groove
12a, 12b, 12c, 12d circumferential groove
3, 13 rib-like land portion
13a central rib-like land portion
13b mediate rib-like land portion
4, 14 resonator
41, 141 air chamber
42a, 142a one-side narrow neck
42b, 142b other-side narrow neck
5, 15 sipe
C tire equatorial plain
Ea one-end side
Eb other-end side
L1, L2 extending length
T tread surface

The invention claimed is:

1. A pneumatic tire, wherein:
in the case that the tire is mounted to a vehicle, a mounting direction of the tire with respect to the vehicle is specified such that one end side of contacting ends of both ends of a tread surface is a vehicle side, and the other end side of the contacting ends is an outer side of the vehicle, and wherein:
two one-side circumferential grooves extending continuously in a tread circumferential direction are disposed on one end side of the tread surface relative to a tire equatorial plane in a tire width direction, and on an one-side land portion partitioned between the two one-side circumferential grooves, an one-side resonator is disposed, the one-side resonator having an one-side air chamber opening to an one-side land portion surface at a position spaced from each of the two one-side circumferential grooves, one or more one-end side narrow necks connecting the one-side air chamber to an one-end side circumferential groove of the two one-side circumferential grooves, and one or more first tire equatorial plane side narrow necks connecting the one-side air chamber to a first tire equatorial plane side circumferential groove of the two one-side circumferential grooves,
the one-end side narrow neck and the first tire equatorial plane side narrow neck have cross section areas approximately identical to each other, and
an extending length of the one-end side narrow neck and an extending length of the first tire equatorial plane side narrow neck are different,
wherein:
a cross section area of the one-end side circumferential groove is relatively smaller than a cross section area of the first tire equatorial plane side circumferential groove, wherein:
the extending length of the one-end side narrow neck is longer than the extending length of the first tire equatorial plane side narrow neck,
wherein:
two other-side circumferential grooves extending continuously in the tread circumferential direction are disposed on the other end side of the tread surface relative to the tire equatorial plane in the tire width direction, and on an other-side land portion partitioned between the two other-side circumferential grooves, an other-side resonator is disposed, the other-side resonator having an other-side air chamber opening to an other-side land portion surface at a position spaced from each of the two other-side circumferential grooves, one or more other-end side narrow necks connecting the other-side air chamber to an other-end side circumferential groove of the two other-side circumferential grooves, and one or more second tire equatorial plane side narrow necks connecting the other-side air chamber to a second tire equatorial plane side circumferential groove of the two other-side circumferential grooves,
the other-end side narrow neck and the second tire equatorial plane side narrow neck have cross section areas approximately identical to each other, and an extending length of the other-end side narrow neck and an extending length of the second tire equatorial plane side narrow neck are different, wherein:

a cross section area of the second tire equatorial plane side circumferential groove is relatively smaller than a cross section area of the other-end side circumferential groove, wherein:

the extending length of the second tire equatorial plane side narrow neck is longer than the extending length of the other-end side narrow neck, and wherein:

a cross section area of the one-end side circumferential groove is relatively larger than a cross section area of the other-end side circumferential groove, and a volume of the one-side air chamber of the one-side resonator is larger than a volume of the other-side air chamber of the other-side resonator.

2. The pneumatic tire according to claim 1, wherein:

the extending length of the one-end side narrow neck is 1.1 to 3.2 times the extending length of the first tire equatorial plane side narrow neck.

3. The pneumatic tire according to claim 1, wherein the number of the one-end side narrow necks is more than the number of the first tire equatorial plane side narrow necks.

4. The pneumatic tire according to claim 1, wherein a plurality of resonators are provided at the both end sides relative to the tire equatorial plane in the tire width direction, and a shape of the one-side resonator on the one end side relative to the tire equatorial plane and a shape of the other-side resonator on the other end side relative to the tire equatorial plane are symmetric to the tire equatorial plane.

5. The pneumatic tire according to claim 1, wherein the other-end side narrow neck and the second tire equatorial plane side narrow neck extend from a same tread circumferential end portion of the other-side air chamber respectively in directions opposite to each other in the tread circumferential direction.

6. The pneumatic tire according to claim 1, wherein the one-end side narrow neck and the first tire equatorial plane side narrow neck respectively extend in an opposite tread circumferential direction from both tread circumferential end portions of the one-side air chamber.

* * * * *